United States Patent
Ye et al.

(10) Patent No.: US 11,308,564 B2
(45) Date of Patent: Apr. 19, 2022

(54) HIERARCHICAL GENERATION OF BOOKING PROBABILITY

(71) Applicant: Airbnb, Inc., San Francisco, CA (US)

(72) Inventors: Peng Ye, Foster City, CA (US); Fan Yang, Redwood, CA (US)

(73) Assignee: Airbnb, Inc., San Francisco, CA (US)

( * ) Notice: Subject to any disclaimer, the term of this patent is extended or adjusted under 35 U.S.C. 154(b) by 50 days.

(21) Appl. No.: 16/214,359

(22) Filed: Dec. 10, 2018

(65) Prior Publication Data

US 2020/0184580 A1 Jun. 11, 2020

(51) Int. Cl.
*G06Q 30/02* (2012.01)
*G06Q 50/14* (2012.01)
*G06N 20/00* (2019.01)

(52) U.S. Cl.
CPC ............. *G06Q 50/14* (2013.01); *G06N 20/00* (2019.01); *G06Q 30/0202* (2013.01); *G06Q 30/0204* (2013.01)

(58) Field of Classification Search
USPC ........................................................ 705/7.31
See application file for complete search history.

(56) References Cited

U.S. PATENT DOCUMENTS

| | | | | |
|---|---|---|---|---|
| 2005/0222865 A1* | 10/2005 | Fox | .................... | G06Q 30/0202 705/28 |
| 2008/0091478 A1 | 4/2008 | Messa | | |
| 2011/0251917 A1 | 10/2011 | Etzioni et al. | | |
| 2012/0239455 A1* | 9/2012 | Crean | .................... | G06Q 10/02 705/7.31 |
| 2014/0222518 A1* | 8/2014 | Adkins | .............. | G06Q 30/0206 705/7.35 |
| 2016/0098649 A1* | 4/2016 | Ifrach | .................... | G06Q 10/02 705/5 |

(Continued)

FOREIGN PATENT DOCUMENTS

WO   WO-2020123062 A1   6/2020

OTHER PUBLICATIONS

Sarro et al.—(Cluster membership probabilities from proper motions and multi-wavelength photometric catalogues, A&A vol. 563, Mar. 5, 2014, pp. 1-14).*

(Continued)

*Primary Examiner* — Matthew D Henry
(74) *Attorney, Agent, or Firm* — Schwegman Lundberg & Woessner, P.A.

(57) ABSTRACT

Systems and methods are provided for extracting a plurality of features for a listing from a datastore comprising a plurality of listings and a plurality of features for each of the plurality of listings, determining a cluster of similar listings to the listing and generating a set of cluster features for the cluster of similar listings, analyzing the set of cluster features for the cluster of similar listings based on a booking price, using a first trained machine learning model to determine a cluster-level probability of booking the listing on the given date, analyzing the plurality of features for the listing using the booking price, using a second trained machine learning model to determine a listing-level probability of booking the listing on the given date, and generating a final probability of booking by combining the cluster-level probability of booking and the listing-level probability of booking.

20 Claims, 8 Drawing Sheets

(56) References Cited

U.S. PATENT DOCUMENTS

2017/0147951 A1    5/2017  Meyer et al.
2017/0178036 A1*   6/2017  Xu ..................... G06F 16/9535

OTHER PUBLICATIONS

"International Application Serial No. PCT/US2019/060050, International Search Report dated Mar. 12, 2020", 2 pgs.
"International Application Serial No. PCT/US2019/060050, Written Opinion dated Mar. 12, 2020", 4 pgs.
"International Application Serial No. PCT US2019 060050, International Preliminary Report on Patentability dated Jun. 24, 2021", 6 pgs.

* cited by examiner

HIERARCHICAL GENERATION OF BOOKING PROBABILITY

BACKGROUND

An online marketplace may provide a number of services (e.g., accommodations, tours, transportation) and allow users to reserve or "book" one or more service. Each service may be unique and each manager or host of each service may set an individual price for each service which may change based on a date of a service. In a conventional commercial setting, generating a probability that a product will be purchased based on different price points is a straightforward problem because a conventional commercial setting has a large volume of similar products. In an online marketplace where each service is unique, however, it is very difficult to determine a probability that a service may be booked for a given date.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
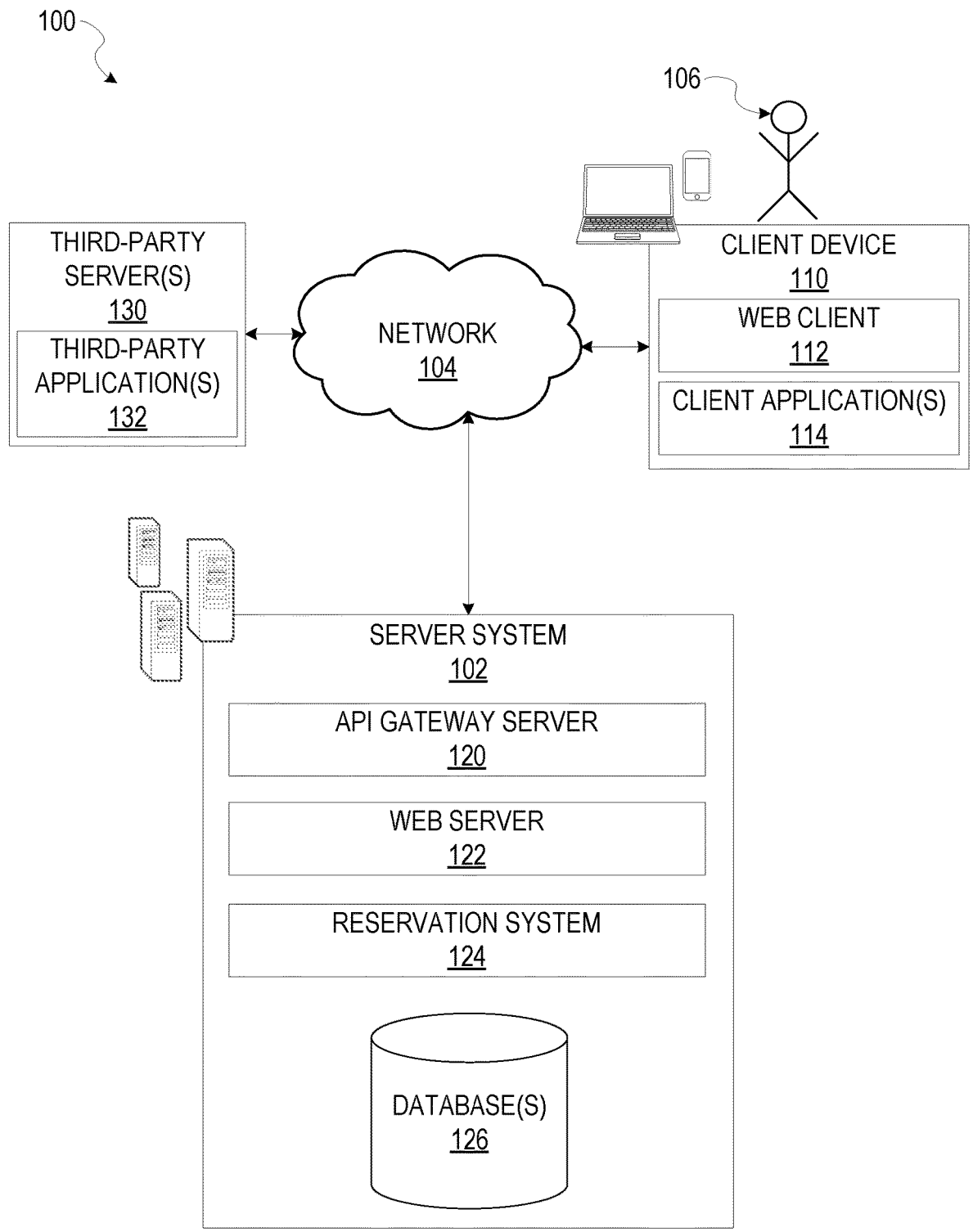
FIG. 1 is a block diagram illustrating a networked system, according to some example embodiments.

Systems and methods described herein relate to generating a probability that a service will be booked for a particular date in an online marketplace comprising a plurality of unique services. For example, the online marketplace may provide various listings for services, such as trip items. For instance, services or trip items may comprise accommodations hosted by various managers which can be reserved by clients, such as an apartment, a house, a cabin, a camper, one or more rooms in an apartment or house, and the like. For instance, one manager or owner of a home may list one or more rooms in his own home on the online marketplace, a second manager of a home may list an entire home on the online marketplace, a third manager may list an entire cabin on the online marketplace, and so forth. In one example, the listings may be time-expiring inventory. With time-expiring inventory (e.g., time-expiring accommodations), if the inventory is not booked and used before it expires, the inventory is wasted, and the manager receives no revenue. The online marketplace may further provide listings for other services or trip items, such as experiences (e.g., local tours), car rental, flights, public transportation, and other transportation or activities related to travel. "Supplier," "manager," "host," and "owner" are used interchangeably herein to mean a user or entity that hosts a particular service (e.g., accommodation, tour, transportation option, etc.).

As explained above, in a conventional commercial setting, generating a probability that a product will be purchased based on different price points is a straightforward problem because a conventional commercial setting has a large volume of similar products. In an online marketplace where each service is unique, however, it is very difficult to determine a probability that a service may be booked for a given date. One problem is that every listing for a service is unique, and every date that a service can be booked is different. For example, a first listing may be for a room in an apartment in San Francisco and a second listing may be for a villa in the countryside in Italy. Each of these listings may have a variety of different features, such as the number of rooms, the number of bathrooms, the price, whether there is a pool, whether there is Wi-Fi, how many people can be accommodated, and so forth. Moreover, the price per night may vary based on whether the night is a weeknight or a weekend, whether the booking is for more than a predetermined number of nights, whether there is a special event in the area for a particular date, and so forth.

Another problem is that the online marketplace does not control the pricing in the marketplace. Instead, the pricing is set by each individual host of the service.

Yet another problem, related to the uniqueness of the listings and the lack of control of pricing, is the ability to generate an accurate demand curve (e.g., to determine an optimal price to maximize revenue). For example, since there is not a lot of data for a particular listing (e.g., perhaps the host has never changed the price or only changed it once in many years), a resulting demand curve from such little data would be flat or may not be smooth (e.g., it would not be monotonically decreasing to indicate demand decreasing as price is increasing).

Another technical challenge in determining a probability of booking is that the complexity of so many factors becomes far beyond human capability to calculate. For example, it is beyond human capacity to determine the dependency of each factor or feature for each unique listing on each of the other factors or features for future nights for each listing. For instance, there may be more than five million active listings in the marketplace and to provide the probability of booking for each listing for future dates (e.g., 120 future dates) is beyond the capacity for human calculation (e.g., five million×120).

In order to overcome these technical challenges, example embodiments use machine learning methodology to analyze features related to a cluster of listings similar to a listing to generate a cluster-level probability of booking, and then to analyze features specific to the listing to generate a listing-level probability of booking. The generated cluster-level probability of booking and the generated listing-level probability of booking are combined to generate a final probability of booking the listing for a given date.

For example, in one example embodiment a computing system in an online marketplace receives a request for a probability of booking a listing on a given date. The computing system extracts a plurality of features for the listing from a datastore comprising a plurality of listings and a plurality of features for each of the plurality of listings and determines a cluster of similar listings to the listing, based on at least one feature of the plurality of features of the listing. The computing system generates a set of cluster features for the cluster of similar listings and analyzes the set of cluster features for the cluster of similar listings based on a booking price, using a first trained machine learning model, to determine a cluster-level probability of booking the listing on the given date. The computing system analyzes the plurality of features for the listing using the booking price, using a second trained machine learning model, to determine a listing-level probability of booking the listing on the given date. The computing system generates a final probability of booking by combining the cluster-level probability of booking and the listing-level probability of booking.

FIG. 1 is a block diagram illustrating a networked system 100, according to some example embodiments. The system 100 may include one or more client devices such as a client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, Global Positioning System (GPS) devices, and so forth. The client device 110 may be a device of a user that is used to request and receive reservation information for services in an online marketplace, request and receive information about services listed in the online marketplace, receive information about a probability of booking a listing on a given date, receive recommendations for an optimal price at which to list a service to maximize revenue, and so forth.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., voice input, touch screen input, alphanumeric input, etc.) to the client device 110 and the input may be communicated to other entities in the system 100 (e.g., third-party servers 130, a server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client 112 (e.g., a browser, such as the Internet Explorer® browser developed by Microsoft® Corporation of Redmond, Washington State) or one or more client applications 114. The client device 110 may include one or more client applications 114 (also referred to as "apps") such as, but not limited to, a web browser, a messaging application, an electronic mail (email) application, an e-commerce site application, a mapping or location application, a reservation application, and the like.

In some embodiments, one or more client applications 114 may be included in a given one of the client devices 110 and configured to locally provide the user interface and at least some of the functionalities of the one or more client applications 114. The client application 114 may be configured to communicate with other entities in the system 100 (e.g., third-party servers 130, the server system 102, etc.), on an as-needed basis, for data and/or processing capabilities not locally available (e.g., to access reservation information or listing information, to request data, to authenticate a user 106, to verify a method of payment, etc.). Conversely, one or more client applications 114 may not be included in the client device 110, and then the client device 110 may use its web browser to access the one or more applications hosted on other entities in the system 100 (e.g., third-party servers 130, the server system 102, etc.).

The system 100 may further include one or more third-party servers 130. The one or more third-party servers 130 may include one or more third-party application(s) 132. The one or more third-party application(s) 132, executing on the third-party server(s) 130, may interact with the server system 102 via a programmatic interface provided by an application programming interface (API) gateway server 120. For example, one or more of the third-party applications 132 may request and utilize information from the server system 102 via the API gateway server 120 to support one or more features or functions on a website hosted by a third party or an application hosted by the third party. The third-party website or application 132, for example, may provide various functionality that is supported by relevant functionality and data in the server system 102.

The server system 102 may provide server-side functionality via the network 104 (e.g., the Internet or a wide area network (WAN)) to one or more third-party servers 130 and/or one or more client devices 110. The server system 102 may be a cloud computing environment, according to some example embodiments. The server system 102, and any servers associated with the server system 102, may be associated with a cloud-based application, in one example embodiment.

In one example, the server system 102 provides server-side functionality for an online marketplace. As explained above, the online marketplace may provide various listings for trip items, such as accommodations hosted by various managers (also referred to as "owners" or "hosts") which can be reserved by clients (also referred to as "users" or "guests"), such as an apartment, a house, a cabin, one or more rooms in an apartment or house, and the like. For example, one manager or owner of a home may list one or more rooms in his own home on the online marketplace, a second manager of a home may list an entire home on the online marketplace, a third manager may list an entire cabin on the online marketplace, and so forth. In one example, the listings may be time-expiring inventory. With time-expiring inventory (e.g., time-expiring accommodations), if the inventory is not booked and used before it expires, the inventory is wasted, and the manager receives no revenue. The online marketplace may further provide listings for other trip items, such as experiences (e.g., local tours), car rental, flights, public transportation, and other transportation or activities related to travel.

The server system 102 may include the API gateway server 120, a web server 122, and a reservation system 124 that may be communicatively coupled with one or more databases 126 or other forms of data store.

The one or more databases 126 may be one or more storage devices that store data related to the reservation system 124 and other systems or data. The one or more databases 126 may further store information related to third-party servers 130, third-party applications 132, client devices 110, client applications 114, users 106, and so forth. The one or more databases 126 may be implemented using any suitable database management system such as MySQL, PostgreSQL, Microsoft SQL Server, Oracle, SAP, IBM DB2, or the like. The one or more databases 126 may include cloud-based storage, in some embodiments.

The reservation system 124 may manage resources and provide back-end support for third-party servers 130, third-party applications 132, client applications 114, and so forth, which may include cloud-based applications. The reservation system 124 may provide functionality for viewing listings related to trip items (e.g., accommodation listings, activity listings, etc.), managing listings, booking listings and other reservation functionality, generating a probability of booking, generating a recommended price for a service, and so forth, for an online marketplace. Further details related to the reservation system 124 are shown in FIG. 2.

Figure 2:
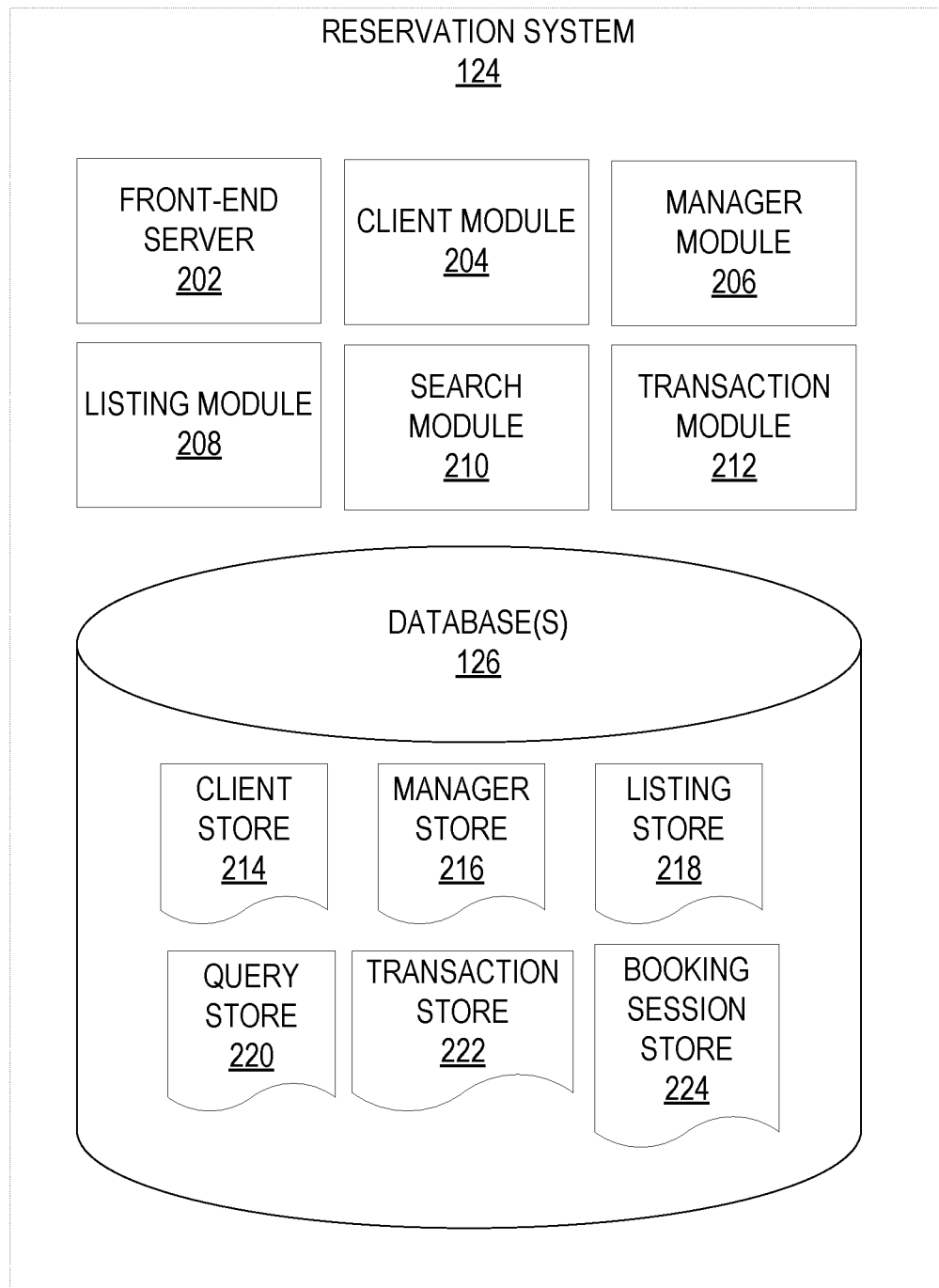
FIG. 2 is a block diagram illustrating a reservation system, according to some example embodiments.

FIG. 2 is a block diagram illustrating a reservation system 124, according to some example embodiments. The reservation system 124 comprises a front-end server 202, a client module 204, a manager module 206, a listing module 208, a search module 210, and a transaction module 212. The one or more database(s) 126 include a client store 214, a manager store 216, a listing store 218, a query store 220, a transaction store 222, and a booking session store 224. The reservation system 124 may also contain different or other modules that are not described herein.

The reservation system 124 may be implemented using a single computing device or a network of computing devices, including cloud-based computer implementations. The computing devices may be server-class computers including one or more high-performance computer processors and random access memory, which may run an operating system such as Linux or the like. The operations of the reservation system 124 may be controlled either through hardware or through computer programs installed in non-transitory computer-readable storage devices such as solid-state devices or magnetic storage devices and executed by the processors to perform the functions described herein.

The front-end server 202 includes program code that allows client and manager client devices 110 to communicate with the reservation system 124. The front-end server 202 may utilize the API gateway server 120 and/or the web server 122 shown in FIG. 1. The front-end server 202 may include a web server hosting one or more websites accessible via a hypertext transfer protocol (HTTP), such that user agents, such as a web browser software application, may be installed on the client devices 110 and can send commands to and receive data from the reservation system 124. The front-end server 202 may also utilize the API gateway server 120 that allows software applications installed on client devices 110 to call to the API to send commands to and receive data from the reservation system 124. The front-end server 202 further includes program code to route commands and data to the other components of the reservation system 124 to carry out the processes described herein and respond to the client devices 110 accordingly.

The client module 204 comprises program code that allows clients (also referred to herein as "users" or "guests") to manage their interactions with the reservation system 124 and executes processing logic for client-related information that may be requested by other components of the reservation system 124. Each client is represented in the reservation system 124 by an individual client object having a unique client ID and client profile, both of which are stored in the client store 214.

The client profile includes a number of client-related attribute fields that may include a profile picture and/or other identifying information, a geographical location, a client calendar, and so forth. The client's geographical location is either the client's current location (e.g., based on information provided by the client device 110), or the client's manually entered home address, neighborhood, city, state, or country of residence. The client location may be used to filter search criteria for time-expiring inventory relevant to a particular client or to assign default language preferences.

The client module 204 provides code for clients to set up and modify the client profile. The reservation system 124 allows each client to communicate with multiple managers. The reservation system 124 allows a client to exchange communications, request transactions, and perform transactions with managers.

The manager module 206 comprises program code that provides a user interface that allows managers (also referred to herein as "hosts" or "owners") to manage their interactions and listings with the reservation system 124 and executes processing logic for manager-related information that may be requested by other components of the reservation system 124. Each manager is represented in the reservation system 124 by an individual manager object having a unique manager ID and manager profile, both of which are stored in the manager store 216. The manager profile is associated with one or more listings owned or managed by the manager and includes a number of manager attributes including transaction requests and a set of listing calendars for each of the listings managed by the manager.

The manager module 206 provides code for managers to set up and modify the manager profile listings. A user 106 of the reservation system 124 can be both a manager and a client. In this case, the user 106 will have a profile entry in both the client store 214 and the manager store 216 and be represented by both a client object and a manager object. The reservation system 124 allows the manager to exchange communications, respond to requests for transactions, and conduct transactions with other managers.

The listing module 208 comprises program code for managers to list trip items, such as time-expiring inventory, for booking by clients. The listing module 208 is configured to receive the listing from a manager describing the inventory being offered; a timeframe of its availability including one or more of the start date, end date, start time, and an end time; a price; a geographical location; images and description that characterize the inventory; and any other relevant information. For example, for an accommodation reservation system, a listing may include a type of accommodation (e.g., house, apartment, room, sleeping space, or other), a representation of its size (e.g., square footage, or number of rooms), the dates that the accommodation is available, and a price (e.g., per night, per week, per month, etc.). The listing module 208 allows a user 106 to include additional information about the inventory, such as videos, photographs, and other media.

The geographical location associated with the listing identifies the complete address, neighborhood, city, and/or country of the offered listing. The listing module 208 is also capable of converting one type of location information (e.g., mailing address) into another type of location information (e.g., country, state, city, and neighborhood) using externally available geographical map information.

The price of the listing is the amount of money a client needs to pay in order to complete a transaction for the inventory. The price may be specified as an amount of money per day, per week, per month, and/or per season, or per another interval of time specified by the manager. Additionally, the price may include additional charges such as cleaning fees, pet fees, service fees, and taxes, or the listing price may be listed separately from additional charges. The listing attributes or features are further described below.

Each listing is represented in the reservation system 124 by a listing object, which includes the listing information as provided by the manager and a unique listing ID, both of which are stored in the listing store 218. Each listing object is also associated with the manager object for the manager providing the listing. Each listing has a number of associated features stored in the listing store 218, as explained in further detail below.

Each listing object has an associated listing calendar. The listing calendar stores the availability of the listing for each time interval in a time period (each of which may be thought of as an independent item of time-expiring inventory), as specified by the manager or determined automatically (e.g., through a calendar import process). For example, a manager may access the listing calendar for a listing, and manually indicate the time intervals for which the listing is available for transaction by a client, which time intervals are blocked as not available by the manager, and which time intervals are already in transaction (e.g., booked) for a client. In addition, the listing calendar continues to store historical information as to the availability of the listing identifying which past time intervals were booked by clients, blocked, or available. Further, the listing calendar may include calendar rules (e.g., the minimum and maximum number of nights allowed for the inventory, a minimum or maximum number of nights needed between bookings, a minimum or maximum number of people allowed for the inventory, etc.). Information from each listing calendar is stored in the listing store 218.

Figure 3:
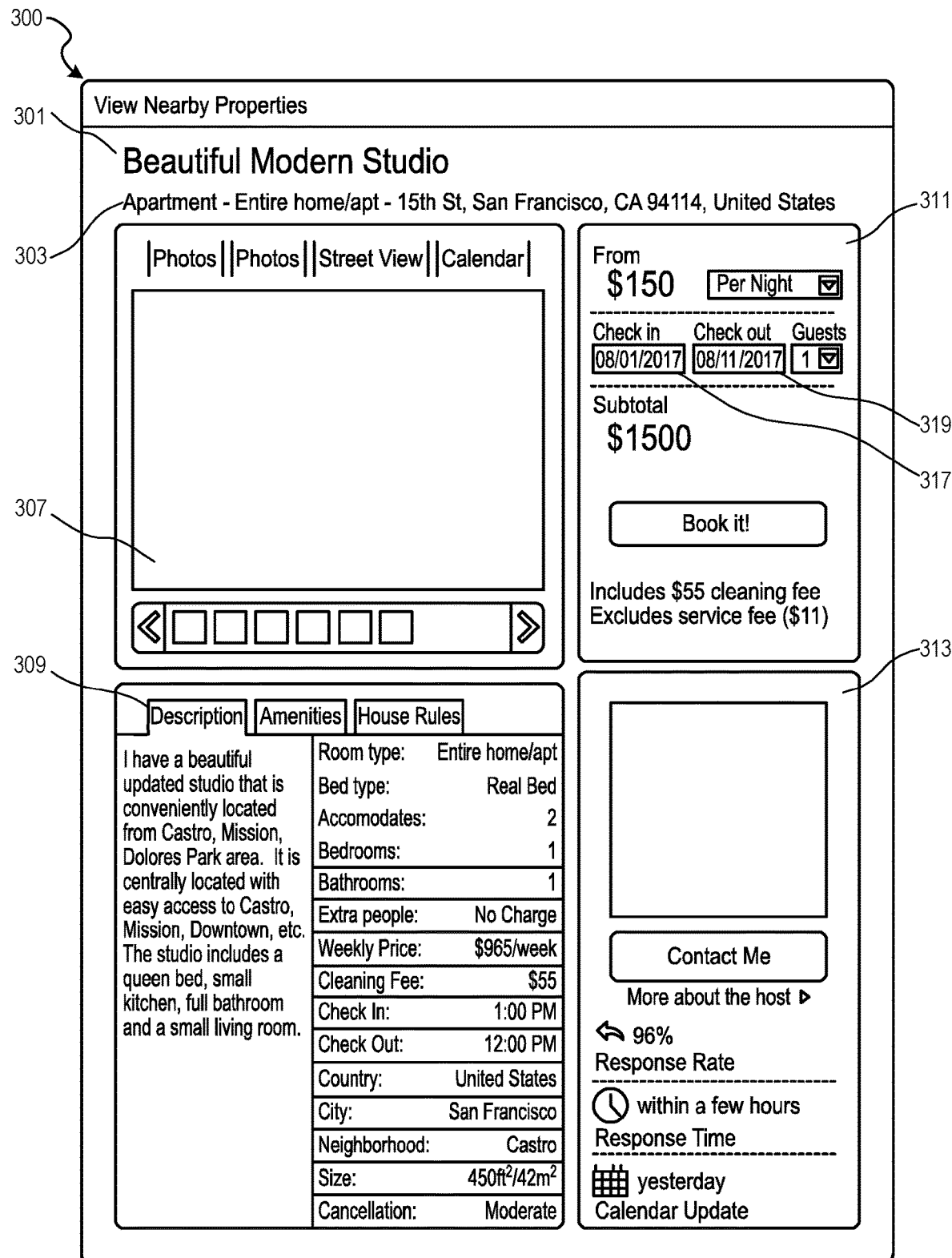
FIG. 3 illustrates an example user interface displaying an example listing for an accommodation, according to some example embodiments.

FIG. 3 illustrates an example user interface 300 for a description of a listing for a trip item (e.g., an apartment in San Francisco) in an online marketplace. The example listing shown in FIG. 3 is for accommodations in San Francisco. In other examples, the listing could be for a tour, local experience, transportation, or other trip item. The listing may include a title 301 and a brief description 303 of the trip item. The listing may further include photos of the trip item, maps of the area or location associated with the trip item, a street view of the trip item, a calendar of the trip item, and so forth, which may be viewed in area 307. The listing may include a detailed description 309, pricing information 311, and the listing host's information 313. The listing may further allow a user to select a date range for the trip item by entering or choosing specific check-in date 317 and check-out date 319.

Returning to FIG. 2, the search module 210 comprises program code configured to receive an input search query from a client and return a set of time-expiring inventory and/or listings that match the input query. Search queries are saved as query objects stored by the reservation system 124 in the query store 220. A query may contain a search location, a desired start time/date, a desired duration, a desired listing type, and a desired price range, and may also include other desired attributes or features of the listing. A potential client need not provide all the parameters of the query listed above in order to receive results from the search module 210. The search module 210 provides a set of time-expiring inventory and/or listings in response to the submitted query to fulfill the parameters of the submitted query. The online system may also allow clients to browse listings without submitting a search query, in which case the viewing data recorded will only indicate that a client has viewed the particular listing without any further details from the submitted search query. Upon the client providing input selecting a time-expiring inventory/listing to more carefully review for possible transaction, the search module 210 records the selection/viewing data indicating which inventory/listing the client viewed. This information is also stored in the query store 220.

The transaction module 212 comprises program code configured to enable clients to submit a contractual transaction request (also referred to as a formal request) to transact for time-expiring inventory. In operation, the transaction module 212 receives a transaction request from a client to transact for an item of time-expiring inventory, such as a particular date range for a listing offered by a particular manager. A transaction request may be a standardized request form that is sent by the client, which may be modified by responses to the request by the manager, either accepting or denying a received request form, such that agreeable terms are reached between the manager and the client. Modifications to a received request may include, for example, changing the date, price, or time/date range (and thus, effectively, which time-expiring inventory is being transacted for). The standardized form may require the client to record the start time/date, duration (or end time), or any other details that must be included for an acceptance to be binding without further communication.

The transaction module 212 receives the filled-out form from the client and, in one example, presents the completed request form including the booking parameters to the manager associated with the listing. The manager may accept the request, reject the request, or provide a proposed alternative that modifies one or more of the parameters. If the manager accepts the request (or the client accepts the proposed alternative), then the transaction module 212 updates an acceptance status associated with the request and the time-expiring inventory to indicate that the request was accepted. The client calendar and the listing calendar are also updated to reflect that the time-expiring inventory has been transacted on for a particular time interval. Other modules not specifically described herein allow the client to complete payment and the manager to receive payment.

The transaction module 212 may further comprise code configured to enable clients to instantly book a listing, whereby the online marketplace books or reserves the listing upon receipt of the filled-out form from the client.

The transaction store 222 stores requests made by clients. Each request is represented by a request object. The request includes a timestamp, a requested start time, and a requested duration or reservation end time. Because the acceptance of a booking by a manager is a contractually binding agreement with the client that the manager will provide the time-expiring inventory to the client at the specified times, all the information that the manager needs to approve such an agreement is included in the request. A manager response to a request comprises a value indicating acceptance or denial and a timestamp. Other models may allow for instant booking, as described above.

The transaction module 212 may also provide managers and clients with the ability to exchange informal requests to transact. Informal requests are not sufficient to be binding upon the client or manager if accepted, and in terms of content, may vary from mere communications and general inquiries regarding the availability of inventory, to requests that fall just short of whatever specific requirements the reservation system 124 sets forth for formal transaction requests. The transaction module 212 may also store informal requests in the transaction store 222, as both informal and formal requests provide useful information about the demand for time-expiring inventory.

The booking session store 224 stores booking session data for all booking sessions performed by clients. Booking session data may include details about a listing that was booked and data about one or more other listings that were viewed (or seriously considered) but not booked by the client before booking the listing. For example, once a listing is booked, the transaction module 212 may send data about the listing or the transaction, viewing data that was recorded for the booking session, and so forth, to be stored in the booking session store 224. The transaction module 212 may utilize other modules or data stores to generate booking session data to be stored in the booking session store 224.

Figure 4:
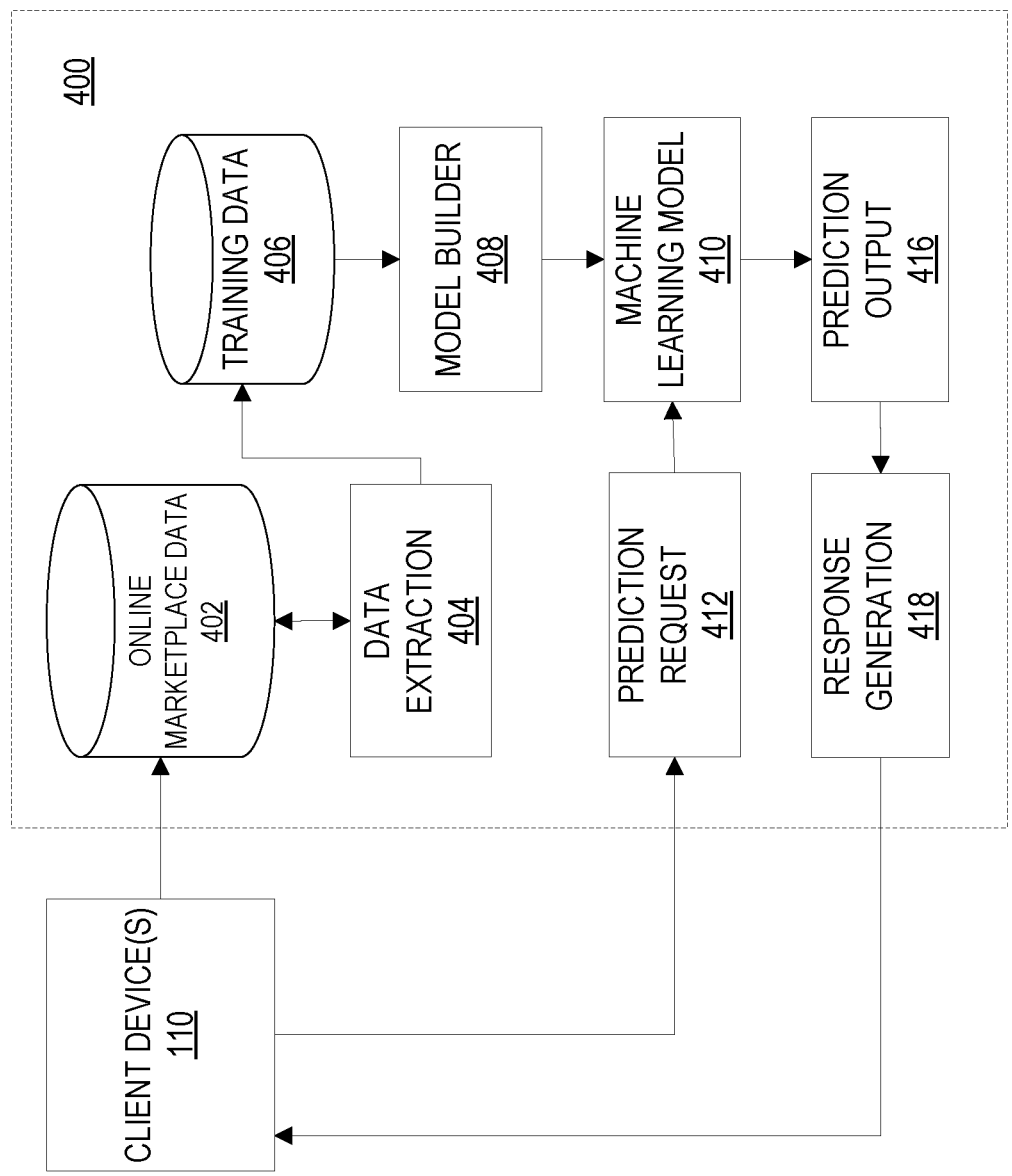
FIG. 4 is a block diagram illustrating a machine learning modeling system, according to some example embodiments.

FIG. 4 is a block diagram illustrating a machine learning modeling system 400 that may be part of the reservation system 124 or server system 102. Client devices 110 interact with the reservation system 124 or server system 102 thereby generating data related to the interactions with the system 102 or 124. For example, a client device 110 may be used to search for services in an online marketplace, view a list of services available in a given location, view individual listings for services, book one or more services, send and receive messages to and from hosts or managers of a service, generate a review for a listing or host, and so forth. Moreover, a client device 110 may be used to list a service, manage a service, send and receive messages to and from guests interested in the service, generate a review for a user (e.g., guest), and so forth. These interactions and data associated with the interactions are stored in one or more databases. In FIG. 4 this is shown as online marketplace data 402. In other examples, this data may be stored in multiple databases, or in databases internal to the machine learning modeling system 400, external to the machine learning modeling system 400, or a combination of both.

The online marketplace data 402 may further comprise data about markets or locations of services. For example, the online marketplace data 402 may comprise location data for a market (e.g., neighborhood, city, state, country), number of services or listings available in a market, how many instant-book listings are available in the market, how many non-instant-book listings are available in the market, popularity of the market, proximity of nearby markets, and so forth. The market or location data may also be in one or more data stores and stored internally to the machine learning modeling system 400 and/or externally to the machine learning modeling system 400. The data stored in the online marketplace data 402 may be used for training a machine learning model 410.

This online marketplace data 402 may thus be received from client devices 110, from other datastores within the server system 102 or reservation system 124, and/or from third-party sources such as the third-party server 130. A data extraction component 404 extracts data from the online marketplace data 402 and stores the data as training data 406. For example, the data extraction component 404 may extract data related to users of the online marketplace, data related to hosts of the online marketplace, data related to markets associated with the online marketplace, and data related to listings associated with the online marketplace.

In one example embodiment, data extracted by the data extraction component 404 from the online marketplace data 402 includes listing features for a plurality of listings over a specified time period (e.g., the past year, the last few months, etc.) to be used for and stored as training data 406. Furthermore, the data extraction component 404 may generate clusters or groups of similar listings to be used as training data. In one example, a listing is similar if it is within a predetermined distance (e.g., 0.25 miles, 5 miles, 10 blocks, in the same neighborhood, in the same city, etc.) from a specified or given listing location. For example, a listing location may be a particular address (e.g., 123 Main Street, San Francisco Calif., 55555), a particular neighborhood (e.g., Financial District in San Francisco), a particular city (e.g., San Francisco), geographical coordinates, or other location data. A listing may be considered similar and included in a cluster of similar listings based on the listing being a predetermined distance from the specified or given listing. In another example, a listing is similar if the listing is within a predetermined distance and has a same room type. An example room type includes a shared room, a room in an accommodation (e.g., a room in a house, apartment, etc.), an entire accommodation (e.g., entire home, apartment, cabin, etc.), and the like. Accordingly, the data extraction component 404 generates a plurality of clusters of similar listings for a plurality of listings and a plurality of cluster-level features and stores this data as training data 406. Likewise, the data extraction component 404 generates and stores a plurality of listing-level features as training data 406. In one example, the cluster of similar listings includes the specified or given listing.

In one example, a training label for the training data is positive if there is a booking that happened between a date on which the machine learning model is making the prediction and the given date. For example, each listing has a unique identifier (ID). ds is a date on which the model is making the prediction (e.g., the date for the requested prediction) and ds_night is the booking date. A training label is positive if there is a booking that happened between ds and ds_night for a listing. For example, training data 406 may include a listing ID, a prediction date, and a booking date. In one example, a prediction date may be Nov. 5, 2018 and a booking date may be Dec. 25, 2018. In another example, the prediction date may be Dec. 1, 2018 for the booking date of Dec. 25, 2018. The booking probability with the prediction date of Nov. 5, 2018 is different than the booking probability with the prediction date of Dec. 1, 2018 because the probability of booking changes depending on how close the prediction date is to the booking date.

A model builder 408 uses the training data 406 to train a machine learning model 410 to predict a probability that a listing will be booked (e.g., reserved) for a given date (e.g., night). In one example, the machine learning model 410 comprises two machine learning models; a first machine learning model for generating a cluster-level probability of booking a listing for a given date and a second machine learning model for generating a listing-level probability of booking the listing for the given or specified date, to generate a hierarchical booking probability. Some example machine learning models that may be used in example embodiments include binary classification models. For example, a Gradient Boosting Decision Tree (GBDT) model may be used for the first machine learning model and the second machine learning model in some example embodiments. It is to be understood that other machine learning models may be used in other example embodiments.

In one example, during training, the training output of the first machine learning model is used to train the second machine learning model. For example, first-in-first-out listing features are used and are divided into the follow three sets:
- (P) Price features: these are listing features directly derived from the listing for the given date.
- (C) Cluster features: these are features (e.g., statistics) extracted from each similar listing in a cluster of similar listings. Listings in the same cluster share the same features.
- (L) Listing features: these are specific features that are unique for each listing.

In one example, the basic unit of the machine learning model 410 is a sum of two GBDT models that are trained using features extracted from different levels (e.g., cluster level and listing level). For example: $f(x)=f_1(P, C)+f_2(P, L)$, where $f_1$ is a function of price features+cluster features and $f_2$ is a function of price+listing features. With this model, a probability (and ultimately a demand (or elasticity) curve) can be derived at two levels:
1) Kdt10k node×cluster level: $f_1(P, C)$
2) Listing level: $f_2(P, L)$ In one example, the machine learning model 410 is trained sequentially. For example, $f_1$ is trained first, and then $f_2$ is trained on the residual of $f_1$.

In one example, a monotone constraint is used in training. The law of demand is a microeconomic law that states that all other factors being equal, as the price of a good or service increases, consumer demand for the good or service will decrease, and vice versa. Example embodiments enforce the law of demand in training the GBDT model by adding a monotonicity constraint on price related features which helps generate a well-behaved monotonic non-increasing demand curve.

Since the training set is significantly large, is it difficult to run sequential training samples. Thus, in one example, in order to utilize all of the training data, the machine learning modeling system 400 runs bagging. For example, the model builder 408 trains multiple f(x) in parallel on different spark executers and then combines them as one model. The final model score is the average of scores for each model. The machine learning model 410 is tested for accuracy until a final machine learning model 410 is trained and ready to use for predictions.

Using a cluster-level machine learning model and a listing-level machine learning model makes the machine learning model 410 easier to interpret and debug since a final probability score can be decomposed into two parts to understand potential issues or effects at each part (e.g., when a prediction is not accurate it is easier to understand where the error was introduced).

A prediction request component 412 receives a request for a prediction (e.g., a probability of booking a listing on a given date) from the client device(s) 110. In other examples, the prediction request component 412 may receive the request from other devices or systems, such as a third-party server 130 or another component within the server system 102. In one example, the request includes a listing identifier and a given date for booking. The prediction request component 412 generates a cluster of similar listings and features (e.g., cluster-level features and listing level features) based on the request and inputs the features into the machine learning model 410, as explained in further detail below.

In another example, the cluster-level features and listing level features are computed in advance for all active listings in an offline batch job, and the probability of booking is also run in an offline batch job. Thus, in this example the probability of booking is precomputed for all listing all nights before receiving a specific prediction request. The precomputed probabilities of booking are stored in a data store (e.g., are uploaded into an online key-value store), such as database(s) 126 or online marketplace data 402). Then when a prediction request is received by the prediction request component 412, the prediction request component 412 can look up the results in the key-value store and return the probability of booking (e.g., via the response generation component 418).

The machine learning model 410 analyzes the features to generate a prediction output 416, as explained in further detail below. In one example, the prediction is a numerical value (e.g., between 0 and 1) to indicate a probability of booking for the listing on the given date. A response generation component 418 analyzes the prediction output 416 and generates a response to be provided to the requesting client device 110, based on the prediction output 416. The response may be the probability of booking, a demand or revenue curve based on the probability of booking, a recommendation for an optimal listing price to maximize revenue, and so forth. The response is provided to the requesting client device 110.

Any one or more of the modules or components described herein may be implemented using one or more processors (e.g., by configuring such one or more processors to perform functions described for that module) and hence may include one or more of the processors. Any one or more of the modules described may be implemented using hardware alone (e.g., one or more of the processors of a machine) or a combination of hardware and software. For example, any module described of the machine learning modeling system 400 may physically include an arrangement of one or more of the processors (e.g., a subset of or among the one or more processors of the machine) configured to perform the operations described herein for that module. As another example, any module of the machine learning modeling system 400 may include software, hardware, or both, that configure an arrangement of one or more processors (e.g., among the one or more processors of the machine) to perform the operations described herein for that module. Accordingly, different modules of the machine learning modeling system 400 may include and configure different arrangements of such processors or a single arrangement of such processors at different points in time. Moreover, any two or more modules of the machine learning modeling system 400 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 5:
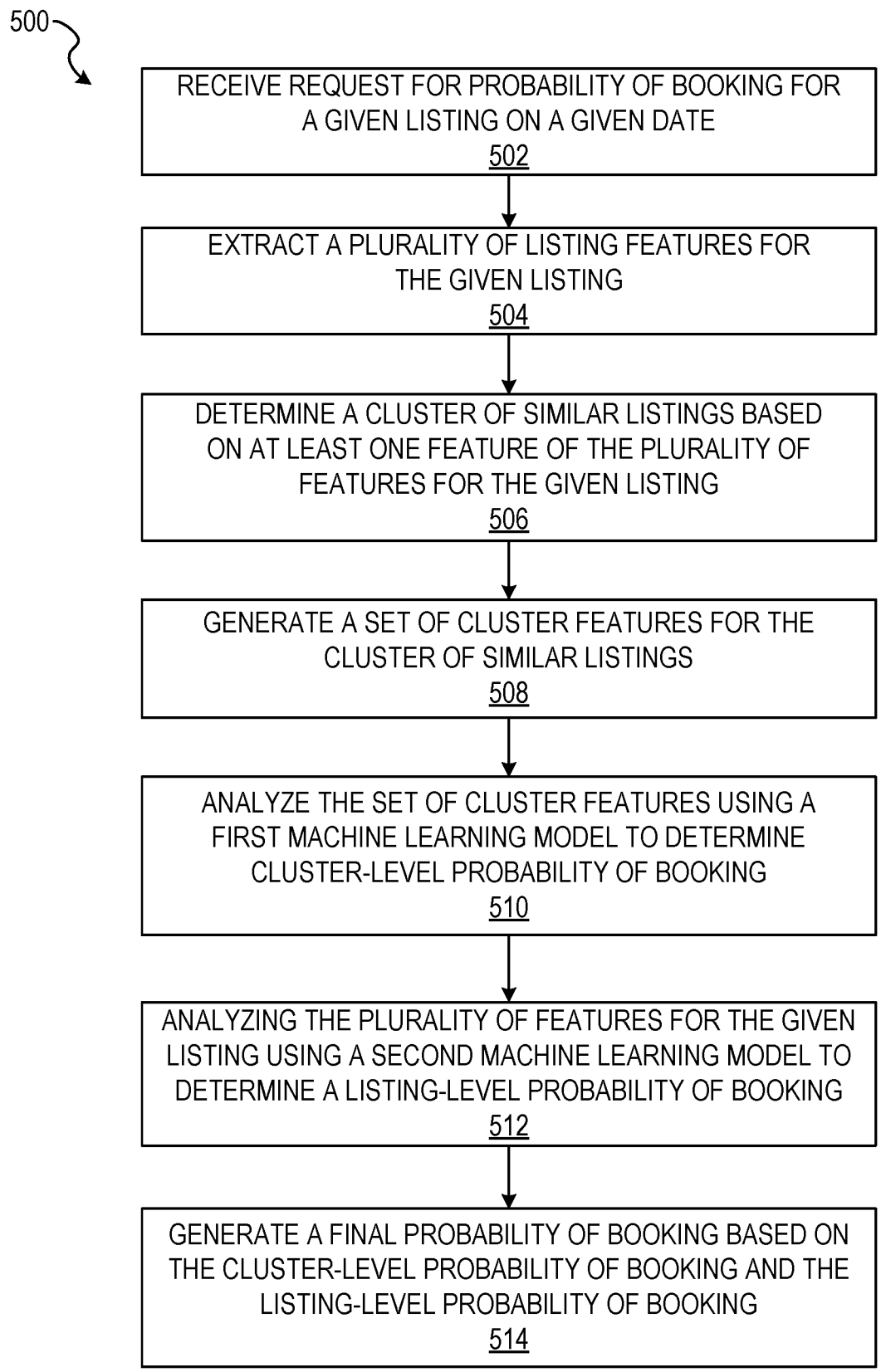
FIG. 5 is a flow chart illustrating aspects of a method for generating a probability that a listing will be booked for a given date, according to some example embodiments.

FIG. 5 is a flow chart illustrating aspects of a method 500 for generating a probability of booking a listing for a given date, according to some example embodiments. For illustrative purposes, the method 500 is described with respect to the networked system 100 of FIG. 1, the reservation system 124 of FIG. 2, and the machine learning modeling system 400 of FIG. 4. It is to be understood that the method 500 may be practiced with other system configurations in other embodiments.

In operation 502, a computing system (e.g., the server system 102 and/or reservation system 124) receives a request for a probability of booking for a listing on a given date. In one example, the request includes a listing identifier (ID) for the listing. The request may be sent by a client device 110, a third-party server 130, another component in the server system 102 and/or reservation system 124, or other computing device or system. The request may be part of a request to generate a demand or revenue curve for the listing, a request for a recommendation for an optimal price to maximize revenue for a given date, and so forth. In one example, the request includes a booking price for the given date for the listing, as explained further below.

In operation 504, the computing system extracts a plurality of features for the listing from a datastore comprising a plurality of listings and a plurality of features for each of the plurality of listings. For example, the computing system accesses the datastore (e.g., database(s) 126, online marketplace data 402, and/or other datastore) to extract the features for the listing (e.g., based on the listing ID). Example features for a listing include price (e.g., a price of the listing for the given date), price ratio (e.g., the price divided by the average booking price in a past predetermined amount of time (e.g., 3 months)), price minimum (e.g., a minimum price for a listing), price maximum (e.g., a maximum price for the listing), occupancy rate (e.g., historical occupancy rate for the listing (e.g., percent of booked nights in the past six months)), listing views (e.g., the number of users that have viewed this listing (e.g., in the past 2-6 days)), number of unique listing viewers, score indicating a quality of images for listing, weekly discount, monthly discount, click through score (e.g., conversion rate), whether the host is a superhost, whether the host is verified (e.g., has submitted identification information (e.g., government issued identification)), minimum nights required by the host, number of bathrooms, whether the listing is instant bookable, cancelation policy, number of bedrooms, number of beds, maximum guests that can stay at the listing, internet availability (e.g., Internet, Wi-Fi), air conditioning, how frequently the host wishes to list the listing (e.g., frequently or occasionally), location, room type, and so forth. The computing system may extract all of the listing features or a predetermined subset of listing features.

In operation 506, the computing system determines a cluster (e.g., set or group) of similar listings to the listing based on at least one feature of the plurality of features of the listing. In one example, the computing system searches the datastore for listings that are within a predetermined distance from a location of the listing to generate the cluster of similar listings. In another example, the computing system searches the datastore for listings that are within a predetermined distance and have a same room type (e.g., entire home, shared room, room, etc.) to generate the cluster of similar listings. In other examples, other features or a different mix of features may be used to determine similar listings to generate the cluster of similar listings. In one example, the cluster of similar listings includes the listing for which the probability of booking is requested.

In operation 508, the computing system generates a set of cluster features for the cluster of similar listings. For example, the computing system accesses the datastore (e.g., database(s) 126, online marketplace data 402, and/or other datastore) to extract the features for each listing in the cluster of similar listings. Example cluster features include price (e.g., a price of the listing for the given date), price ratio (e.g., the price divided by the average booking price in a past predetermined amount of time (e.g., 3 months)), average booking price for each listing, distance between date of prediction and given date, day of the week of the given date (e.g., Monday), date of the year of the given date (e.g., a value of 1-365), average listing views of listing in the cluster (e.g., how many times users looked at the listing for the past week or other time period), current occupancy rate for the cluster on the given date (e.g., number of booked listings divided by the total number of listings (e.g., 50/100=50%)), a room type, and so forth. The computing system may extract a predetermined one or more of these features, or other features, in some embodiments. Note that for some of the cluster features the computing system calculates the feature based on the feature for each listing. For example, the computing system determines the average views of listing for the cluster based on the listing views for each listing.

In operation 510, the computing system analyzes the set of cluster features for the cluster of similar listings using a first trained machine learning model (e.g., the cluster-level model described above) to determine a cluster-level probability of booking the listing on the given date. For example, the computing system generates a vector comprising the set of cluster features and inputs the vector and a booking price into the first trained machine learning model. In one example the booking price is included in the request for the probability of booking the listing on the given date. For example, a client device or other computing system may wish to know the probability of booking based on one or more proposed booking prices. In another example, the booking price is the price feature of the listing obtained from price features of the data store (e.g., the price for the listing on the given date). The first trained machine learning model outputs a cluster-level probability of booking the listing on the given date. In one example, the cluster-level probability is a value between 0 and 1 indicating how likely the listing will be booked on the given date (e.g., 0.5 (50% probability), 0.9 (90% probability), etc.).

In operation 512, the computing system analyzes the plurality of features for the listing using a second trained machine learning model (e.g., the listing-level machine learning model described above). Note that the plurality of features for the listing may include different features than the cluster features or additional features than the cluster-level features. For example, the computing system generates a vector comprising the set of features for the listing and inputs the vector and a booking price into the first trained machine learning model. Examples of a booking price are described above. The second trained machine learning model outputs a listing-level probability of booking the listing on the given date. In one example, the listing-level probability is a value between 0 and 1 indicating how likely it is that the listing will be booked on the given date (e.g., 0.5 (50% probability), 0.9 (90% probability), etc.).

In operation 514, the computing system generates a final probability of booking by combining the cluster-level probability value and the listing-level probability value. For example, assuming the first model (m1) outputs a score s1 and the second model (m2) outputs a score s2, then sigmoid (s1), the Prob(booking|m1)=sigmoid(s1), Prob(booking|m2)=sigmoid(s2) and the final probability is sigmoid(s1+s2). Here sigmoid(x)=1/(1+exp(−x)).

In one example, the computing system generates a final probability of booking for each of a plurality of booking prices to generate data points for a demand curve or revenue curve for the listing. For example, the computing system performs operations 512-514 for each of a plurality of booking prices. For example, an actual booking price is the booking price for the listing for the given date (e.g., stored as a listing feature or derived from one or more listing features in the datastore). To generate a demand curve or revenue curve, the computing system may use several proposed booking prices in addition to the actual booking price to generate data points for the demand curve or revenue curve. For example, the actual booking price may be $100 and the proposed booking prices may be $80, $90, $110, and the like. In another example, the proposed booking prices may be 0.6×price (e.g., actual price of $100), 0.7×price, 0.8×price, 0.9×price, 1.1×price, and so forth, as different price points that can be input into the machine learning model 410 (e.g., each of the first machine learning model and the second machine learning model) to generate a final probability of booking for each of the actual and proposed booking prices. The final probability values are used as data points to generate a demand curve and/or a revenue curve. The computing system uses the final probability values to generate the demand curve or revenue curve. In one example, the demand curve is generated using a sigmoid function to connect the data points and generate a curve from the data points. In one example, the revenue curve is generated using the price times the final probability of booking.

Figure 6:
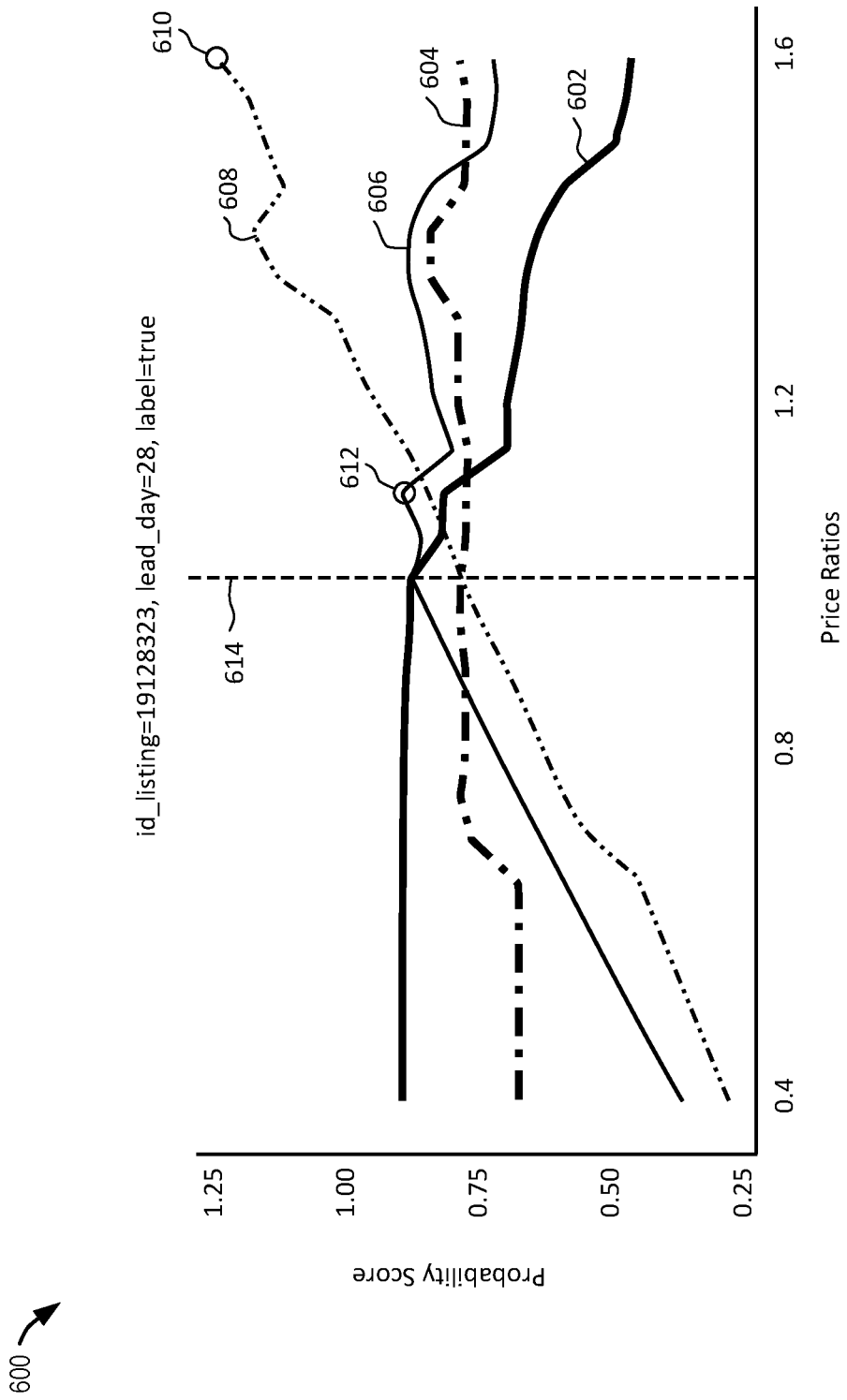
FIG. 6 illustrates an example demand curve and revenue curve for a listing, according to some example embodiments.

FIG. 6 is a graph 600 illustrating an example demand curve 602 and revenue curve 606 generated from the final probability values, for a specific listing and specific date. The dotted line 614 indicates the actual booking price (e.g., 1.0). An example demand curve 604 and revenue curve 608 generated from a model that does not use the hierarchical structure described herein (e.g., a first cluster-level machine learning model and a second listing-level machine learning model). As can be seen, the demand curve 604 is flat and actually increases, indicating it is not an accurate demand curve, versus the demand curve 606 that decreases as the price increases. Also, the optimal price to maximize revenue indicated at the point 610 of the revenue curve 608 is clearly not accurate since it is at the highest price point even though the demand curve 604 has slightly decreased at that point. The optimal price to maximize revenue indicated at point 612, however, appears to be a much more accurate. One reason for this is that example embodiments use a monotonic constraint, as explained above.

As explained above, in one example, the cluster-level features and listing level features are computed in advance for all active listings in an offline batch job, and the probability of booking is also run in an offline batch job. Thus, in this example the probability of booking is precomputed for all listings all nights before receiving a specific request for a probability of booking. For example, the computing system performs operations 504-514 for each of a plurality of listing for all nights (e.g., within a specified time frame). The precomputed final probability of booking for each of the plurality of bookings for all nights are then stored in one or more data stores (e.g., database(s) 126 or online marketplace data 402). For example, the precomputed final probability of booking for each of the plurality of bookings for all nights can be uploaded into an online key-value store. When a request is received by the computing system for a probability of booking for a given listing on a given date (as explained above), the computing system accesses the data store to determine or retrieve the probability of booking for the given listing on the given date and then returns the probability of booking to a requesting device (e.g., client device 110 or third-party server 130). The computing system can also receive requests for multiple data points or to generate a demand curve, as also describe above. In this example, the computing system accesses the data store to retrieve the multiple data points to return to the requesting device or to generate a demand curve and return the demand curve to the requesting device. Other requests can be received and responded to using the probability of booking data, such as a request for a recommendation for an optimal price for a listing, and so forth.

The following examples describe various embodiments of methods, machine-readable media, and systems (e.g., machines, devices, or other apparatus) discussed herein.

Example 1. A method, comprising:

receiving, by a computing system in an online marketplace, a request for a probability of booking a listing on a given date;

extracting, by the computing system in the online marketplace, a plurality of features for the listing from a datastore comprising a plurality of listings and a plurality of features for each of the plurality of listings;

determining, by the computing system in the online marketplace, a cluster of similar listings to the listing, based on at least one feature of the plurality of features of the listing;

generating, by the computing system in the online marketplace, a set of cluster features for the cluster of similar listings;

analyzing the set of cluster features for the cluster of similar listings based on a booking price, using a first trained machine learning model, to determine a cluster-level probability of booking the listing on the given date;

analyzing the plurality of features for the listing using the booking price, using a second trained machine learning model, to determine a listing-level probability of booking the listing on the given date; and generating, by the computing system in the online marketplace, a final probability of booking by combining the cluster-level probability of booking and the listing-level probability of booking.

Example 2. A method according to any of the previous examples, wherein the request comprises a unique identifier for the listing used for extracting the plurality of features for the listing from the datastore.

Example 3. A method according to any of the previous examples, wherein the request comprises the booking price associated with the listing on the given date.

Example 4. A method according to any of the previous examples, wherein extracting the plurality of features for the listing from the datastore comprises generating a predetermined set of features for the listing comprising at least one of price, price ratio, price minimum, price maximum, occupancy rate, listing views, quality of images for listing, weekly discount, monthly discount, click-through score, number of bathrooms, cancelation policy, number of bedrooms, number of beds, maximum guests, and internet availability.

Example 5. A method according to any of the previous examples, wherein the at least one feature of the plurality of features of the listing is a location associated with the listing, and determining the cluster of similar listings to the listing, based on at least one feature of the plurality of features of the listing, comprises determining listings within a predefined distance from the location associated with the listing.

Example 6. A method according to any of the previous examples, wherein the at least one feature of the plurality of features of the listing is a room type associated with the listing, and determining the cluster of similar listings to the listing is based on the location and room type associated with the listing.

Example 7. A method according to any of the previous examples, wherein the set of cluster features for the cluster of similar listings comprises at least one of price, price ratio, room type, average booking price, day of the week, day of the year, average listing views, and occupancy rate.

Example 8. A method according to any of the previous examples, wherein the final probability of booking is generated for a plurality of booking prices to generate a plurality of probabilities of booking the listing on the given date, and the method further comprises:

generating a demand curve based on the plurality of probabilities of booking the listing on the given date.

Example 9. A computing system comprising:

a memory that stores instructions; and one or more processors configured by the instructions to perform operations comprising:

receiving a request for a probability of booking a listing on a given date;

extracting a plurality of features for the listing from a datastore comprising a plurality of listings and a plurality of features for each of the plurality of listings;

determining a cluster of similar listings to the listing, based on at least one feature of the plurality of features of the listing;

generating a set of cluster features for the cluster of similar listings;

analyzing the set of cluster features for the cluster of similar listings based on a booking price, using a first trained machine learning model, to determine a cluster-level probability of booking the listing on the given date;

analyzing the plurality of features for the listing using the booking price, using a second trained machine learning model, to determine a listing-level probability of booking the listing on the given date; and generating a final probability of booking by combining the cluster-level probability of booking and the listing-level probability of booking.

Example 10. A computing system according to any of the previous examples, wherein the request comprises a unique identifier for the listing used for extracting the plurality of features for the listing from the datastore.

Example 11. A computing system according to any of the previous examples, wherein the request comprises the booking price associated with the listing on the given date.

Example 12. A computing system according to any of the previous examples, wherein extracting the plurality of features for the listing from the datastore comprises generating a predetermined set of features for the listing comprising at least one of price, price ratio, price minimum, price maximum, occupancy rate, listing views, quality of images for listing, weekly discount, monthly discount, click-through score, number of bathrooms, cancelation policy, number of bedrooms, number of beds, maximum guests, and internet availability.

Example 13. A computing system according to any of the previous examples, wherein the at least one feature of the plurality of features of the listing is a location associated with the listing, and determining the cluster of similar listings to the listing, based on at least one feature of the plurality of features of the listing, comprises determining listings within a predefined distance from the location associated with the listing.

Example 14. A computing system according to any of the previous examples, wherein the at least one feature of the plurality of features of the listing is a room type associated with the listing, and determining the cluster of similar listings to the listing is based on the location and room type associated with the listing.

Example 15. A computing system according to any of the previous examples, wherein the set of cluster features for the cluster of similar listings comprises at least one of price, price ratio, room type, average booking price, day of the week, day of the year, average listing views, and occupancy rate.

Example 16. A computing system according to any of the previous examples, wherein the final probability of booking is generated for a plurality of booking prices to generate a plurality of probabilities of booking the listing on the given date, and the operations further comprise:

generating a demand curve based on the plurality of probabilities of booking the listing on the given date.

Example 17. A non-transitory computer-readable medium comprising instructions stored thereon that are executable by at least one processor to cause a computing device associated with a first data owner to perform operations comprising:

receiving a request for a probability of booking a listing on a given date;

extracting a plurality of features for the listing from a datastore comprising a plurality of listings and a plurality of features for each of the plurality of listings;

determining a cluster of similar listings to the listing, based on at least one feature of the plurality of features of the listing;

generating a set of cluster features for the cluster of similar listings;

analyzing the set of cluster features for the cluster of similar listings based on a booking price, using a first trained machine learning model, to determine a cluster-level probability of booking the listing on the given date;

analyzing the plurality of features for the listing using the booking price, using a second trained machine learning model, to determine a listing-level probability of booking the listing on the given date; and generating a final probability of booking by combining the cluster-level probability of booking and the listing-level probability of booking.

Example 18. A non-transitory computer-readable medium according to any of the previous examples, wherein the at least one feature of the plurality of features of the listing is a room type associated with the listing, and determining the cluster of similar listings to the listing is based on the location and room type associated with the listing.

Example 19. A non-transitory computer-readable medium according to any of the previous examples, wherein the set of cluster features for the cluster of similar listings comprise at least one of price, price ratio, room type, average booking price, day of the week, day of the year, average listing views, and occupancy rate.

Example 20. A non-transitory computer-readable medium according to any of the previous examples, wherein the final probability of booking is generated for a plurality of booking prices to generate a plurality of probabilities of booking the listing on the given date, and the operations further comprise:

generating a demand curve based on the plurality of probabilities of booking the listing on the given date.

Figure 7:
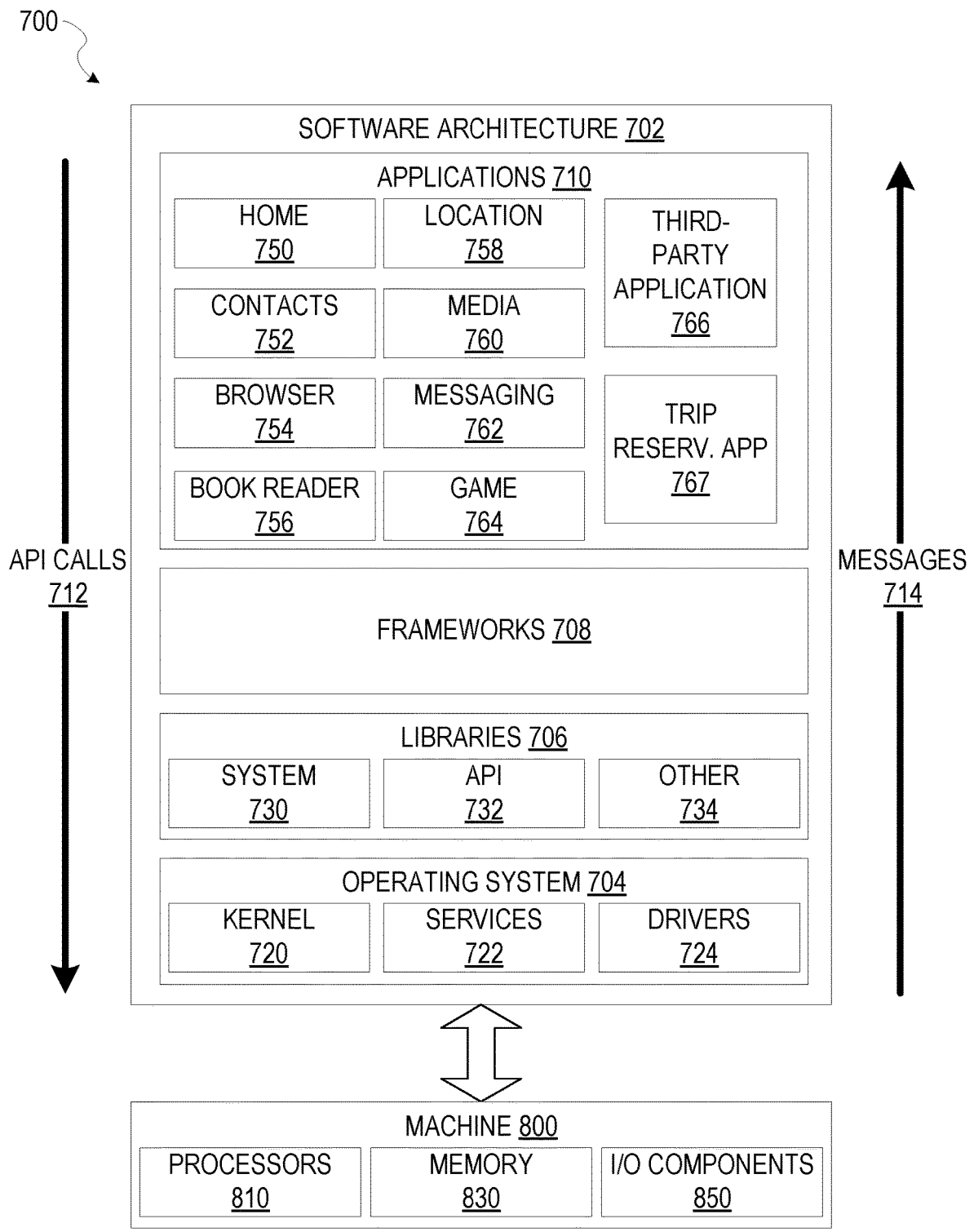
FIG. 7 is a block diagram illustrating an example of a software architecture that may be installed on a machine, according to some example embodiments.

FIG. 7 is a block diagram 700 illustrating a software architecture 702, which can be installed on any one or more of the devices described above. For example, in various embodiments, the client device 110 and server systems 130, 102, 120, 122, and 124 may be implemented using some or all of the elements of the software architecture 702. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render graphic content in two dimensions (2D) and in three dimensions (3D) on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Some embodiments may particularly include a trip reservation application 767, which may be any application that requests data or other tasks to be performed by systems and servers described herein, such as the server system 102, third-party servers 130, and so forth. In certain embodiments, this may be a standalone application that operates to manage communications with a server system such as the third-party servers 130 or server system 102. In other embodiments, this functionality may be integrated with another application. The trip reservation application 767 may request and display various data related to an online marketplace and may provide the capability for a user 106 to input data related to the system via voice, a touch interface, or a keyboard, or using a camera device of the machine 800, communication with a server system via the I/O components 850, and receipt and storage of object data in the memory 830. Presentation of information and user inputs associated with the information may be managed by the trip reservation application 767 using different frameworks 708, library 706 elements, or operating system 704 elements operating on a machine 800.

Figure 8:
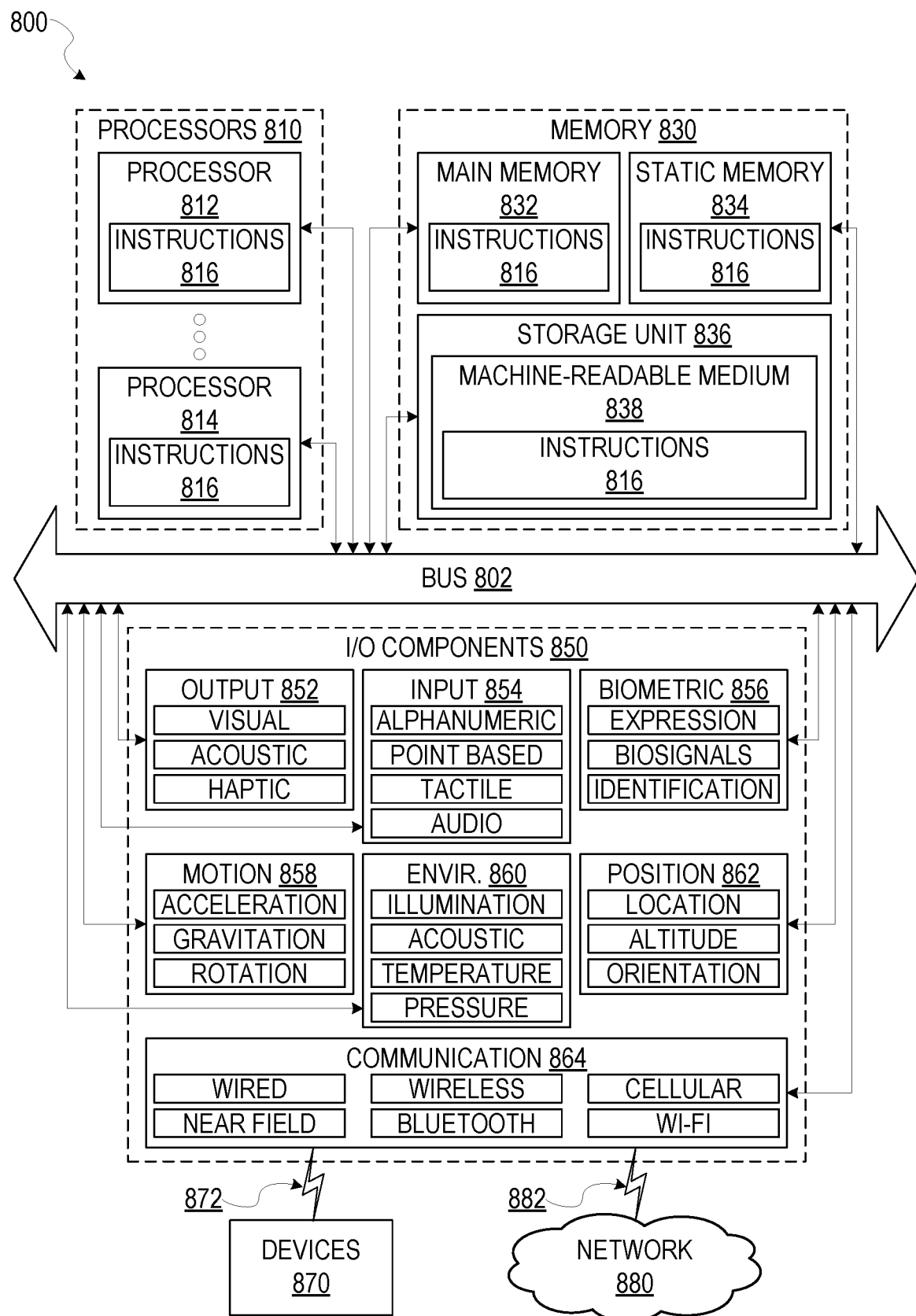
FIG. 8 illustrates a diagrammatic representation of a machine, in the form of a computer system, within which a set of instructions may be executed for causing the machine to perform any one or more of the methodologies discussed herein, according to an example embodiment.

FIG. 8 is a block diagram illustrating components of a machine 800, according to some embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application 710, an applet, an app, or other executable code) for causing the machine 800 to perform any one or more of the methodologies discussed herein can be executed. In alternative embodiments, the machine 800 operates as a standalone device or can be coupled (e.g., networked) to other machines. In a networked deployment, the machine 800 may operate in the capacity of a server machine 130, 102, 120, 122, 124, and the like, or a client device 110 in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and I/O components 850, which can be configured to communicate with each other via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute instructions 816 contemporaneously. Although FIG. 8 shows multiple processors 810, the machine 800 may include a single processor 810 with a single core, a single processor 810 with multiple cores (e.g., a multi-core processor 810), multiple processors 812, 814 with a single core, multiple processors 812, 814 with multiple cores, or any combination thereof.

The memory 830 comprises a main memory 832, a static memory 834, and a storage unit 836 accessible to the processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown, in an example embodiment, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions 816, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 include output components 852 and input components 854. The output components 852 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 850 include biometric components 856, motion components 858, environmental components 860, or position components 862, among a wide array of other components. For example, the biometric components 856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 include acceleration sensor components (e.g., accelerometer), gravitation sensor components, rotation sensor components (e.g., gyroscope), and so forth. The environmental components 860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, communication components 864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 870 may be another machine 800 or any of a wide variety of peripheral devices (e.g., a peripheral device coupled via a Universal Serial Bus (USB)).

Moreover, in some embodiments, the communication components 864 detect identifiers or include components operable to detect identifiers. For example, the communication components 864 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 864, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

In example embodiments, the instructions 816 are transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, in other example embodiments, the instructions 816 are transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Furthermore, the machine-readable medium 838 is non-transitory (in other words, not having any transitory signals) in that it does not embody a propagating signal. However, labeling the machine-readable medium 838 "non-transitory" should not be construed to mean that the medium is incapable of movement; the machine-readable medium 838 should be considered as being transportable from one physical location to another. Additionally, since the machine-readable medium 838 is tangible, the machine-readable medium 838 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
generating, from feature values extracted from historical marketplace data associated with an online marketplace, sets of training clusters, each training cluster including feature values describing similar listings posted to the online marketplace;
training a first machine learning model based on the set of training clusters, yielding a first trained machine learning model for generating cluster-level probability values that listings will be booked on specified booking dates;
training a second machine learning model based on an output of training the first trained machine learning model, yielding a second trained machine learning model for generating listing-level probability values that listings will be booked on specified booking dates;
receiving, by a computing system in the online marketplace, a request for a probability that a listing will be booked on a given date;
extracting, by the computing system in the online marketplace, a set of feature values describing the listing, the set of feature values corresponding to a plurality of features and having been generated from first listing data describing the listing, the set of feature values extracted from a datastore comprising sets of feature values describing a plurality of listings;
determining, by the computing system in the online marketplace, a cluster of similar listings to the listing, the cluster of similar listings being determined based on a comparison of the set of feature values describing the listing and the sets of feature values describing the plurality of listings;
generating, by the computing system in the online marketplace, a set of cluster feature values for the cluster of similar listings based on the set of feature values describing the listing and sets of feature values describing the cluster of similar listings;
using the set of cluster feature values and a booking price as input into the first trained machine learning model, to generate a cluster-level probability value indicating a first likelihood that the listing will be booked on the given date;
using the set of feature values describing the listing and the booking price as input into the second trained machine learning model, to generate a listing-level probability value indicating a second likelihood that the listing will be booked on the given date; and
generating, by the computing system in the online marketplace, a final probability value indicating a third likelihood that the listing will be booked on the given date by combining the cluster-level probability value and the listing-level probability value.

2. The method of claim 1, wherein the request comprises a unique identifier for the listing.

3. The method of claim 1, wherein the request comprises the booking price associated with the listing on the given date.

4. The method of claim 1, wherein the plurality of features comprises at least one of price, price ratio, price minimum, price maximum, occupancy rate, listing views, quality of images for listing, weekly discount, monthly discount, click-through score, number of bathrooms, cancelation policy, number of bedrooms, number of beds, maximum guests, and internet availability.

5. The method of claim 1, wherein the plurality of features includes a location associated with the listing, and determining the cluster of similar listings to the listing comprises determining listings within a predefined distance from the location associated with the listing.

6. The method of claim 5, wherein the plurality of features is a room type associated with the listing, and determining the cluster of similar listings to the listing is based on the location and room type associated with the listing.

7. The method of claim 1, wherein the set of cluster feature values for the cluster of similar listings comprises values for at least one of price, price ratio, room type, average booking price, day of the week, day of the year, average listing views, and occupancy rate.

8. The method of claim 1, wherein the final probability value is generated for a plurality of proposed booking prices to generate a plurality of probability values that the listing will be booked on the given date, and the method further comprises:
generating a demand curve based on the plurality of probability values that the listing will be booked on the given date.

9. A computing system comprising:
a memory that stores instructions; and
one or more processors configured by the instructions to perform operations comprising:
generating, from feature values extracted from historical marketplace data associated with an online marketplace, sets of training clusters, each training cluster including feature values describing similar listings posted to the online marketplace;
training a first machine learning model based on the set of training clusters, yielding a first trained machine learning model for generating cluster-level probability values that listings will be booked on specified booking dates;
training a second machine learning model based on an output of training the first trained machine learning model, yielding a second trained machine learning model for generating listing-level probability values that listings will be booked on specified booking dates;
receiving a request for a probability that a listing will be booked on a given date;
extracting a set of feature values describing the listing, the set of feature values corresponding to a plurality of features and having been generated from first listing data describing the listing, the set of feature values extracted from a datastore comprising sets of feature values describing a plurality of listings;
determining a cluster of similar listings to the listing, the cluster of similar listings being determined based on a comparison of the set of feature values describing the listing and the sets of feature values describing the plurality of listings;

generating a set of cluster feature values for the cluster of similar listings based on the set of feature values describing the listing and sets of feature values describing the cluster of similar listings;

using the set of cluster feature values and a booking price as input into the first trained machine learning model, to generate a cluster-level probability value indicating a first likelihood that the listing will be booked on the given date;

using the set of feature values describing the listing and the booking price into the second trained machine learning model, to generate a listing-level probability value indicating a second likelihood that the listing will be booked on the given date; and generating a final probability value indicating a third likelihood that the listing will be booked on the given date by combining the cluster-level probability value and the listing-level probability value.

10. The computing system of claim 9, wherein the request comprises a unique identifier for the listing.

11. The computing system of claim 9, wherein the request comprises the booking price associated with the listing on the given date.

12. The computing system of claim 9, wherein the plurality of features comprises at least one of price, price ratio, price minimum, price maximum, occupancy rate, listing views, quality of images for listing, weekly discount, monthly discount, click-through score, number of bathrooms, cancelation policy, number of bedrooms, number of beds, maximum guests, and internet availability.

13. The computing system of claim 9, wherein the plurality of features includes a location associated with the listing, and determining the cluster of similar listings to the listing comprises determining listings within a predefined distance from the location associated with the listing.

14. The computing system of claim 13, wherein the plurality of features is a room type associated with the listing, and determining the cluster of similar listings to the listing is based on the location and room type associated with the listing.

15. The computing system of claim 9, wherein the set of cluster feature values for the cluster of similar listings comprises values for at least one of price, price ratio, room type, average booking price, day of the week, day of the year, average listing views, and occupancy rate.

16. The computing system of claim 9, wherein the final probability value is generated for a plurality of proposed booking prices to generate a plurality of probability values that the listing will be booked on the given date, and the operations further comprise:

generating a demand curve based on the plurality of probability values that the listing will be booked on the given date.

17. A non-transitory computer-readable medium comprising instructions stored thereon that are executable by at least one processor to cause a computing device associated with a first data owner to perform operations comprising:

generating, from feature values extracted from historical marketplace data associated with an online marketplace, sets of training clusters, each training cluster including feature values describing similar listings posted to the online marketplace;

training a first machine learning model based on the set of training clusters, yielding a first trained machine learning model for generating cluster-level probability values that listings will be booked on specified booking dates;

training a second machine learning model based on an output of training the first trained machine learning model, yielding a second trained machine learning model for generating listing-level probability values that listings will be booked on specified booking dates;

receiving a request for a probability that a listing will be booked on a given date;

extracting a set of feature values describing the listing, the set of feature values corresponding to a plurality of features and having been generated from first listing data describing the listing, the set of feature values extracted from a datastore comprising sets of feature values describing a plurality of listings;

determining a cluster of similar listings to the listing, the cluster of similar listings being determined based on a comparison of the set of feature values describing the listing and the sets of feature values describing the plurality of listings;

generating a set of cluster feature values for the cluster of similar listings based on the set of feature values describing the listing and sets of feature values describing the cluster of similar listings;

using the set of cluster feature values and a booking price as input into the first trained machine learning model, to generate a cluster-level probability value indicating a first likelihood that the listing will be booked on the given date;

using the set of feature values describing the listing and the booking price into the second trained machine learning model, to generate a listing-level probability value indicating a second likelihood that the listing will be booked on the given date; and generating a final probability value indicating a third likelihood that the listing will be booked on the given date by combining the cluster-level probability value and the listing-level probability value.

18. The non-transitory computer-readable medium of claim 17, wherein the plurality of features is a room type associated with the listing, and determining the cluster of similar listings to the listing is based on the location and room type associated with the listing.

19. The non-transitory computer-readable medium of claim 17, wherein the set of cluster feature values for the cluster of similar listings comprises values for at least one of price, price ratio, room type, average booking price, day of the week, day of the year, average listing views, and occupancy rate.

20. The non-transitory computer-readable medium of claim 17, wherein the final probability value is generated for a plurality of proposed booking prices to generate a plurality of probability values that the listing will be booked on the given date, and the operations further comprise:

generating a demand curve based on the plurality of probability values that the listing will be booked on the given date.

* * * * *